United States Patent
Wang

(10) Patent No.: US 10,234,634 B2
(45) Date of Patent: Mar. 19, 2019

(54) FLEXIBLE DEVICE FOR DISTRIBUTING HYBRID CABLE AND TRANSITIONING FROM TRUNK CABLE TO JUMPER CABLE

(71) Applicant: CommScope Technologies LLC, Hickory, NC (US)

(72) Inventor: Chi-ming Wang, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/389,473

(22) Filed: Dec. 23, 2016

(65) Prior Publication Data

US 2017/0199334 A1 Jul. 13, 2017

Related U.S. Application Data

(60) Provisional application No. 62/276,110, filed on Jan. 7, 2016.

(51) Int. Cl.
*G02B 6/38* (2006.01)
*G02B 6/44* (2006.01)
(Continued)

(52) U.S. Cl.
CPC ......... *G02B 6/3817* (2013.01); *G02B 6/3897* (2013.01); *G02B 6/4416* (2013.01);
(Continued)

(58) Field of Classification Search
None
See application file for complete search history.

(56) References Cited

U.S. PATENT DOCUMENTS

| 5,202,538 A | 4/1993 | Skirpan |
| 5,938,462 A | 8/1999 | Wilson et al. |

(Continued)

FOREIGN PATENT DOCUMENTS

| KR | 2015-0006712 | 1/2015 |
| WO | 2013/063045 | 5/2013 |

(Continued)

OTHER PUBLICATIONS

International Search Report and Written Opinion Corresponding to International Application No. PCT/US2016/068273;dated Feb. 21, 2017; 12 Pages.

(Continued)

*Primary Examiner* — Chad H Smith
(74) *Attorney, Agent, or Firm* — Myers Bigel, P.A.

(57) ABSTRACT

A cable breakout assembly includes: a cable including a plurality of signal-carrying members enclosed in a protective jacket; a plurality of connector modules, each of the connector modules having at least one side wall and a connector mounted thereto, wherein the connector modules are arranged in serial relationship along an axis, with a gap between adjacent connector modules; and at least one flex member extending between the connector modules that substantially prevents the axial spacing of the gaps between adjacent connector modules from increasing, but enables adjacent connector modules to flex about the axis relative to each other. Each of the signal carrying-members is connected with a respective connector.

7 Claims, 2 Drawing Sheets

(51) Int. Cl.
*H01R 25/00* (2006.01)
*H02G 15/18* (2006.01)

(52) U.S. Cl.
CPC ......... *G02B 6/4472* (2013.01); *H01R 25/003* (2013.01); *H02G 15/18* (2013.01)

(56) References Cited

U.S. PATENT DOCUMENTS

| | | | |
|---|---|---|---|
| 6,045,399 | A | 4/2000 | Yu |
| 6,340,250 | B1 | 1/2002 | Auclair |
| 6,711,337 | B2 | 3/2004 | Hodge et al. |
| 6,993,237 | B2 * | 1/2006 | Cooke ................. G02B 6/4455 385/134 |
| 7,136,555 | B2 * | 11/2006 | Theuerkorn ......... G02B 6/3894 385/100 |
| 7,292,763 | B2 | 11/2007 | Smith et al. |
| RE40,358 | E | 6/2008 | Thompson et al. |
| 7,477,824 | B2 | 1/2009 | Reagan et al. |
| 7,489,849 | B2 | 2/2009 | Reagan et al. |
| 7,791,864 | B2 | 9/2010 | Matyas et al. |
| 7,805,044 | B2 | 9/2010 | Reagan et al. |
| 7,837,397 | B2 | 11/2010 | Fingler et al. |
| 7,844,158 | B2 | 11/2010 | Gronvall et al. |
| 7,893,567 | B1 | 2/2011 | Deros et al. |
| 8,275,228 | B2 | 9/2012 | Livingston et al. |
| 8,401,387 | B2 | 3/2013 | Biegert et al. |
| 8,532,490 | B2 | 9/2013 | Smith et al. |
| 8,565,571 | B2 | 10/2013 | Kimbrell et al. |
| 8,792,767 | B2 | 7/2014 | Fabrykowski et al. |
| 8,929,740 | B2 | 1/2015 | Smith et al. |
| 9,069,151 | B2 | 6/2015 | Conner |
| 9,078,287 | B2 | 7/2015 | Khemakhem et al. |
| 9,606,320 | B2 | 3/2017 | Wang |
| 9,742,176 | B2 | 8/2017 | Wang |
| 2005/0163448 | A1 | 7/2005 | Blackwell, Jr. et al. |
| 2005/0175307 | A1 | 8/2005 | Battey et al. |
| 2005/0213921 | A1 | 9/2005 | Smith et al. |
| 2006/0056782 | A1 * | 3/2006 | Elkins, II ............ G02B 6/2558 385/100 |
| 2006/0093303 | A1 | 5/2006 | Reagan et al. |
| 2009/0226181 | A1 | 9/2009 | Fingler et al. |
| 2011/0097052 | A1 | 4/2011 | Solheid et al. |
| 2012/0008257 | A1 | 1/2012 | Rebers et al. |
| 2012/0295486 | A1 | 11/2012 | Petersen et al. |
| 2013/0084050 | A1 | 4/2013 | Vastmans et al. |
| 2013/0088407 | A1 | 4/2013 | King et al. |
| 2013/0108227 | A1 | 5/2013 | Conner |
| 2013/0146355 | A1 | 6/2013 | Strasser et al. |
| 2014/0140671 | A1 | 5/2014 | Islam |
| 2014/0199079 | A1 | 7/2014 | Smith et al. |
| 2015/0219856 | A1 | 8/2015 | Wang |
| 2015/0270637 | A1 | 9/2015 | Islam et al. |
| 2015/0270654 | A1 | 9/2015 | Islam et al. |
| 2016/0266326 | A1 * | 9/2016 | Gniadek ................ H01R 24/66 |
| 2016/0276817 | A1 | 9/2016 | Wang |

FOREIGN PATENT DOCUMENTS

| | | |
|---|---|---|
| WO | 2013/165831 | 11/2013 |
| WO | WO 2015/186067 A1 | 12/2015 |

OTHER PUBLICATIONS

International Search Report and Written Opinion of the International Searching Authority, International Application No. PCT/US2018/023244, dated Jun. 22, 2018, 10 pp.
International Preliminary Report on Patentability, International Application No. PCT/US2016/068273, dated Jul. 19, 2018, 8 pp.
International Search Report and Written Opinion for corresponding PCT Application No. PCT/US2015/014347, dated May 15, 2015.
International Search Report and Written Opinion for corresponding PCT Application No. PCT/US2016/022600, dated Jun. 27, 2016.
Notification Concerning Transmittal of International Preliminary Report on Patentability for corresponding PCT Application No. PCT/US2016/022600 dated Sep. 28, 2017.
Notification of Transmittal of the International Search Report and the Written Opinion of the International Searching Authority, or the Declaration for corresponding PCT Application No. PCT/US2017/052133, dated Jan. 11, 2018.
Supplemental European Search Report corresponding to European Application No. 15746886.9, dated Aug. 22, 2017.

* cited by examiner

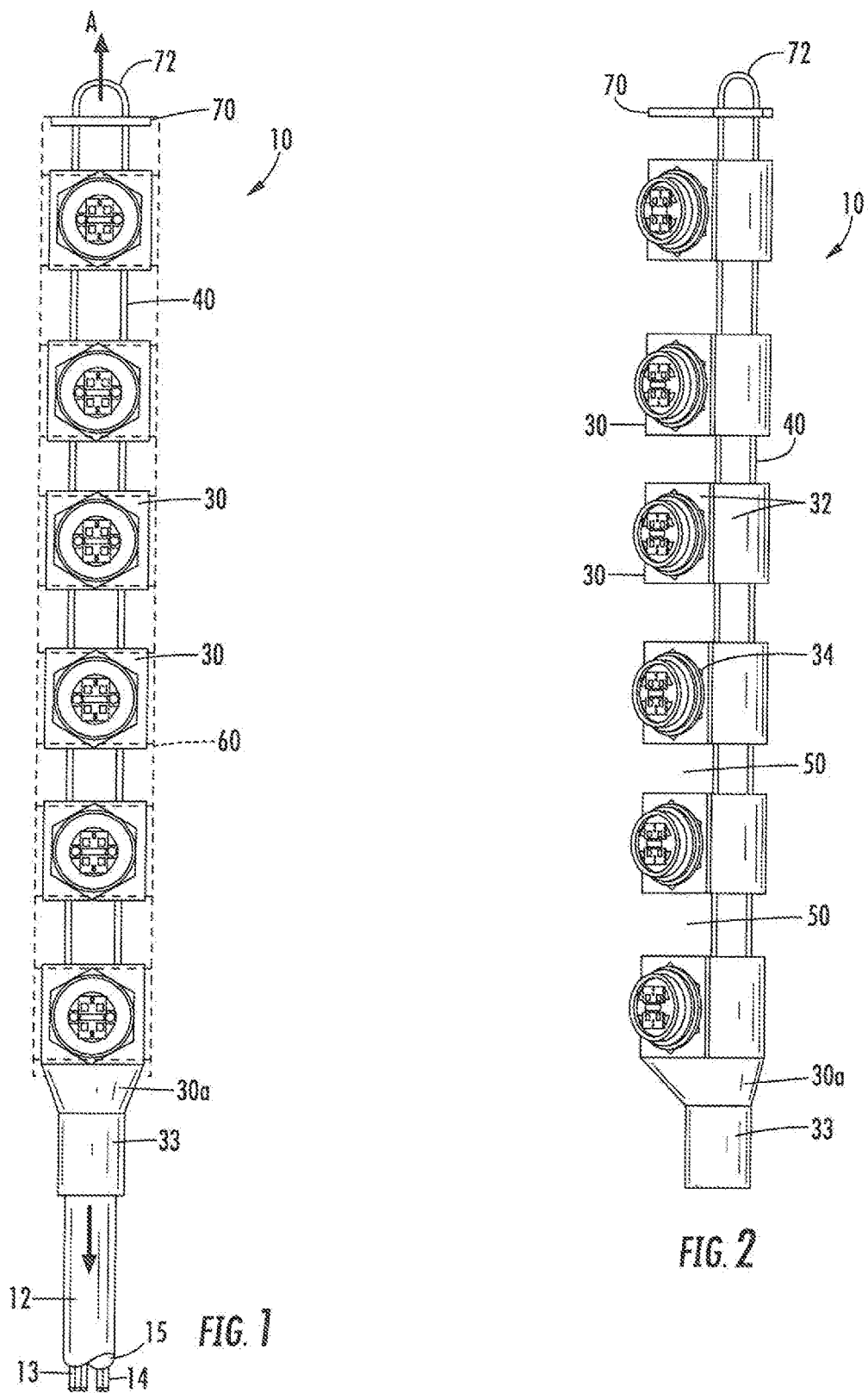

FLEXIBLE DEVICE FOR DISTRIBUTING HYBRID CABLE AND TRANSITIONING FROM TRUNK CABLE TO JUMPER CABLE

RELATED APPLICATION

The present application claims priority from and the benefit of U.S. Provisional Patent Application No. 62/276,110, filed Jan. 7, 2016, the disclosure of which is hereby incorporated by reference in its entirety.

FIELD OF THE INVENTION

The present invention relates generally to power and signal distribution, and more particularly to distribution from trunk cables to jumper cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable. However, in order to use a single hybrid trunk cable, at some point the trunk cable must transition to jumper cables or cords. Typically, these, are distributed inside an enclosure that transitions the trunk conductor gauge to the jumper conductor gauge and connects the optical fibers in the trunk to the optical fibers in the jumper cables.

In some instances, transitions are achieved by making connections inside the enclosure, requiring it to be opened, cables to be fed/mated to the enclosure, and power and fiber connections to be made, all in the field (e.g., on the top of antenna tower sites near a remote radio unit (RRU)). This practice can create many issues for installers, including time, safety, connection errors (such, as loose power connections and/or poor fiber cleaning), and more opportunity for connector damage.

Some additional approaches employ assemblies with optical and power pigtails (see, e.g., U.S. Pat. No. 9,057,862) and assemblies with connectors for subsequent connection with jumper cables (see, e.g., U.S. patent application Ser. No. 14/448,269, filed Jul. 31, 2014), the disclosure of each of which is hereby incorporated herein in its entirety.

SUMMARY

As a first aspect, embodiments of the invention are directed to a cable breakout assembly. The assembly comprises: a cable including a plurality of signal-carrying members enclosed in a protective jacket; a plurality of connector modules, each of the connector modules having at least one side wall and a connector mounted thereto, wherein the connector modules are arranged in serial relationship along an axis, with a gap between adjacent connector modules; and at least one flex member extending between the connector modules that substantially prevents the axial spacing of the gaps between adjacent connector modules from increasing, but enables adjacent connector modules to flex about the axis relative to each other. Each of the signal carrying-members is connected with a respective connector.

As a second aspect, embodiments of the invention are directed to a cable breakout assembly, comprising: a cable including a plurality of signal-carrying members enclosed in a protective jacket; a plurality of connector modules, each of the connector modules having at least one side wall and a connector mounted thereto. The connector modules are arranged in serial relationship along an axis, with a gap between adjacent connector modules. Each of the signal carrying-members is connected with a respective connector, with at least some of the signal-carrying members being routed through a first connector module and connected to a second connector module.

As a third aspect, embodiments of the invention are directed to a cable breakout assembly, comprising: a cable including a plurality of signal-carrying members enclosed in a protective jacket; and a plurality of connector modules, each of the connector modules having at least one side wall and a connector mounted thereto. The connector modules are arranged in serial relationship along an axis, with a gap between adjacent connector modules. Each of the signal carrying-members is connected with a respective connector. An outer covering covers the gaps between connector modules.

BRIEF DESCRIPTION OF THE FIGURES

FIG. 1 is a front view of a breakout assembly according to embodiments of the invention, with the outer covering shown in broken line.

FIG. 2 is a perspective view of the breakout assembly of FIG. 1.

DETAILED DESCRIPTION

Figure 3:
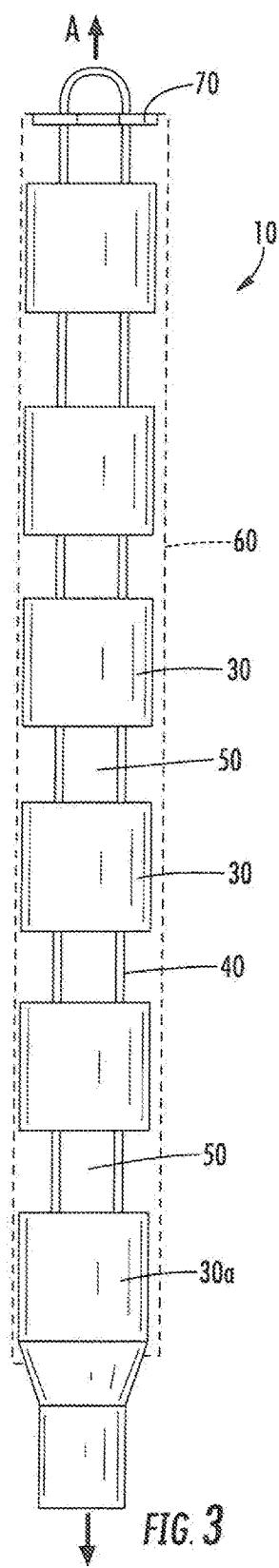
FIG. 3 is a rear view of the breakout assembly of FIG. 1, with the outer covering shown in broken line.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, a flexible breakout assembly, designated broadly at 10, is shown therein. The assembly 10 includes a hybrid trunk cable 12, a plurality of connector modules 30 that are serially arranged along an axis A, and flex members 40 that connect the connector modules 30. These are described in greater detail below.

Referring now to FIG. 1, the hybrid trunk cable 12 has a plurality of power conductors 13 and a plurality of optical fiber 14 encased in a jacket 15. Those skilled in this art will appreciate that the assembly 10 is also suitable for other types of cables, such as power cables, fiber optic cables, and the like.

One of the connector modules, designated at 30a, has an open top end, but includes a tapered nozzle 33 at its lower end. The hybrid trunk cable 12 enters the connector module 30a through the nozzle 33. The entry point of the hybrid trunk cable 12 may include one or more of a threaded sleeve, a cable gland, gaskets, sealing/potting compounds, and the like, to provide a sealed entry for the hybrid trunk cable 12. In some embodiments, the hybrid trunk cable 12 is attached with sufficient retention strength that the assembly 10 can be hoisted by the cable 12 as it is raised to a position on an antenna tower or the like.

Figure 4:
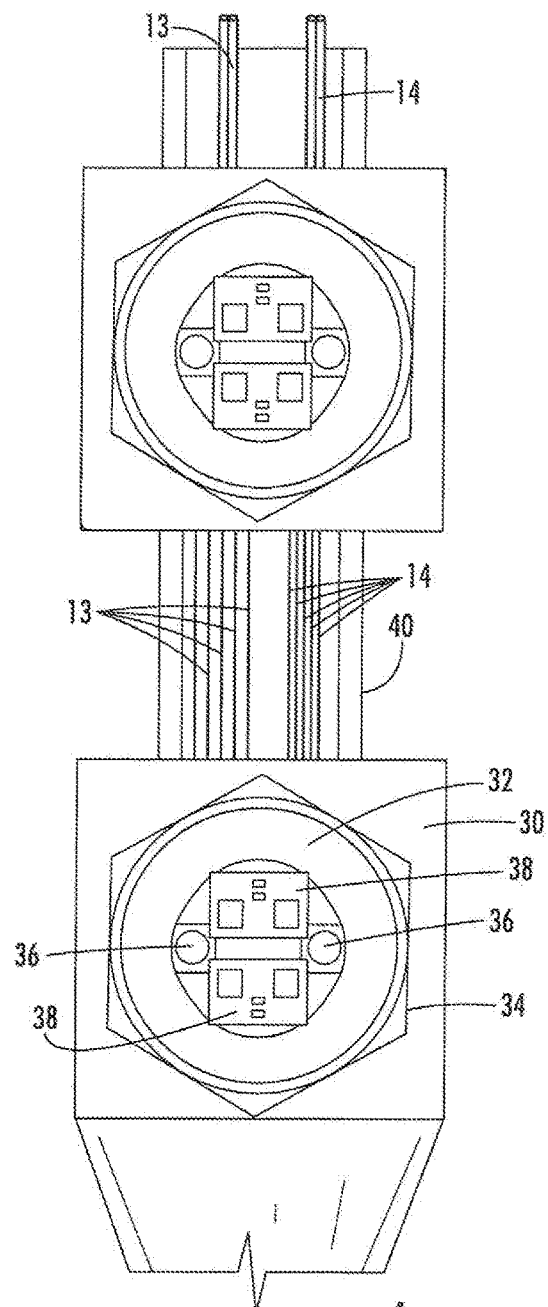
FIG. 4 is an enlarged perspective view of two connector modules of the breakout assembly of FIG. 1.

As can be seen in FIGS. 2 and 4, each of the other connector modules 30 has an enclosure with one or more side walls 32 and open ends. A hybrid connector 34 is mounted to one of the side walls 32. The hybrid connector 34 has ports 36 for power jumper cables and ports 38 for fiber optic jumper cables. Power conductors 13 from the hybrid trunk cable 12 are routed through the open ends of one or more of the connector modules 30, then connected to the hybrid connector 34 of a respective connector module 30 to provide power to the ports 36. Similarly, optical fibers 14 from the hybrid trunk cable 12 are routed through one or more of the connector modules 30 to provide signals to the ports 38 of a respective connector module 30. Power and fiber optic jumper cables attached to the ports 36, 38 can then be routed to connect to another piece of electronic equipment, such as a remote radio head or the like.

The connector modules 30 may be formed of a variety of materials, such as a rigid plastic (e.g., polycarbonate) or a metal. The connector modules 30 may also include features for attaching the flex members 40 discussed below. The side walls 32 of the connector modules 30 may also take different shapes (e.g., triangular, trapezoidal, ovoid, and cylindrical), although it may be desired that the connector modules 30 have at least one flat surface to facilitate the mounting of the hybrid connectors 34. Also, in some embodiments two or more connectors may be mounted on each connector module 30. Moreover, in some embodiments it may be desirable to mount the connectors 30 to angle downwardly (this may reduce space needed for jumper cables and/or may reduce exposure to water) or upwardly. Also, in some embodiments the hybrid connectors 34 may be replaced with discrete power and optical connectors.

As shown in FIGS. 2 and 3, two flex members 40 (shown schematically as cords, poles or wires) extend between and connect the connector modules 30, such that axially spaced gaps 50 are present between the connector modules 30. The flex members 40 are configured to provide pull strength (i.e., to substantially prevent axial separation of the connector modules 30 along axis A), but to enable bending of the assembly 10 between connector modules 30 relative to the axis A.

Although the flex members 40 are shown as cords/poles/wires, many other variations are contemplated. For example, the flex members 40 may be thin sheets of metal (e.g., aluminum) extending between the connector modules 30, wherein the flex members are attached to one or two side walls 32 of each connector module 30 (if the connector modules 30 are formed of a metallic material, the flex members 40 may be attached thereto via welding). As another example, if the flex members 40 are cords/poles/wires, they may extend between any or all of the corners of the connector modules 30, or they may be attached along the center of the side walls 32 of the connector modules 30. The flex members 40 may be attached to the connector modules 30 via clips, hooks, adhesive, tape, or the like. As another example, an overall flex member framework (e.g., formed of sheet aluminum) may include pockets or receptacles for the connector modules 30. As a further example, the flex members 40 may be included in the hybrid cable 12 and simply routed from the hybrid cable 12 to the connector modules 30. As still another example, the flex members 40 may be a "hook-and-eye" arrangement, a linked chain, or the like that permits flexure in one or more directions while limiting axial separation. Other variations may also be employed, as well as combinations of the exemplary configurations noted above.

The assembly 10 also includes an outer covering 60 (shown schematically in FIGS. 1-3) that encloses the gaps 50 between the connector modules 30. The outer covering 60 may be a continuous jacket, sheath or the like that covers all of the gaps 50 and includes holes for the hybrid connectors 34 (shown in broken line in FIGS. 1 and 3). Alternatively, the outer covering may be a series of jackets/sheaths, each of which covers one gap 50 between two connector modules 30. The outer covering 60 may be formed of a variety of materials, such as polyethylene or PVC. In some instances, the outer covering 60 may have sufficient mechanical integrity to serve as the flex members discussed above. The outer covering 60 may be applied in any manner known for the application of protective outer coverings, including overmolding, bath-dipping, and the like (one or more of these techniques may require covering of the connectors 34, the open ends of the enclosure, and/or other components to prevent material from entering these areas; a plastic film or tape may be a suitable protective covering).

The assembly 10 illustrated herein has a separate cap 70 that is separated from the uppermost connector module 30 by a gap 80 and is attached to the flex members 40. The cap 70 may have a loop 72 (formed by the flex members 40 in FIGS. 1-3) that can provide a location at which the assembly 10 may be pulled or hung during installation. In some instances the cap 70 may be attached directly to the uppermost connector module 30.

A breakout assembly as described may have various advantages. The configuration of the assembly 10 may render it easier to install, as its thin profile may allow it to be pulled though a monopole tower (which is typically quite narrow), and its flexibility may render it more maneuverable within the monopole tower as it is routed therein. The thin profile (the connector modules 30 may measure between about 0.75 and 2.5 inches in width and depth) may also occupy reduced tower space as it is being pulled up the tower and/or after it is mounted.

Packaging costs may be reduced, as the flexibility of the assembly 10 can enable it to be wound around a reel for shipping. In some embodiments, the flex members 40 are selected to meet or exceed the bend radius of the hybrid trunk cable 12. Also, the use of connector modules 30 can simplify the process of manufacturing different sizes of the assembly (e.g., six RRU vs. nine RRU), as the number of connector modules 30 can simply be increased without the need for additional molding, casting or forming tooling.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable breakout assembly, comprising:
   a cable including a plurality of signal-carrying members enclosed in a protective jacket;
   a plurality of connector modules, each of the connector modules including a rigid enclosure having at least one side wall and a connector mounted to the side wall, each of the connectors including a port mounted in the side wall of the enclosure;
   wherein the connector modules are arranged in serial relationship along an axis, with a gap between adjacent connector modules; and
   wherein each of the signal carrying-members is connected with a respective connector; and
   wherein an outer covering covers the gaps between connector modules, and wherein the outer covering includes holes such that the ports of the connectors are accessible through the side wall for connection to a jumper cable,
   wherein at least one flex member extends between the connector modules that substantially prevents axial spacing of the gaps between adjacent connector modules from increasing, but enables adjacent connector modules to flex about the axis relative to each other.

2. The cable breakout assembly defined in claim 1, wherein the cable is a hybrid trunk cable and the signal-carrying members comprise a plurality of conductors and a plurality of optical fibers.

3. The cable breakout assembly defined in claim 1, wherein the connectors are hybrid connectors.

4. The cable breakout assembly defined in claim 1, wherein the at least one flex member is connected to all of the connector modules.

5. The cable breakout assembly defined in claim 1, further comprising a cap attached to the assembly opposite the cable.

6. The cable breakout assembly defined in claim 5, wherein the cap is separated from an adjacent connector module by a gap.

7. The cable breakout assembly defined in claim 1, wherein each of the connector modules includes at least one side wall having a flat surface, and wherein each connector is mounted on the flat surface of its respective connector module.

* * * * *